United States Patent
Uehara et al.

(10) Patent No.: US 6,769,518 B2
(45) Date of Patent: Aug. 3, 2004

(54) ROTATING BRAKE MEMBER OF BRAKING DEVICE FOR VEHICLE AND METHOD FOR ANTIRUST TREATMENT THEREOF

(75) Inventors: Hiroshi Uehara, Tochigi (JP); Nobuaki Nagashima, Gunma (JP); Kosuke Hatasaki, Tochigi (JP); Ryosuke Kawagoshi, Tochigi (JP); Motoharu Murata, Tochigi (JP)

(73) Assignees: Kiriu Corporation, Kiryu (JP); Nihon Parkerizing Co., Ltd., Tokyo (JP)

( * ) Notice: Subject to any disclaimer, the term of this patent is extended or adjusted under 35 U.S.C. 154(b) by 0 days.

(21) Appl. No.: 10/258,877

(22) PCT Filed: Feb. 20, 2002

(86) PCT No.: PCT/JP02/01463

§ 371 (c)(1),
(2), (4) Date: Oct. 30, 2002

(87) PCT Pub. No.: WO02/066853

PCT Pub. Date: Aug. 29, 2002

(65) Prior Publication Data

US 2003/0089564 A1 May 15, 2003

(30) Foreign Application Priority Data

Feb. 23, 2001 (JP) .......................... 2001-047835

(51) Int. Cl.[7] .............................. E16D 65/12
(52) U.S. Cl. .............................. 188/218 XL
(58) Field of Search ............... 188/218 XL, 251 M, 188/264 A, 264 AA

(56) References Cited

U.S. PATENT DOCUMENTS

| 4,808,275 | A | * | 2/1989 | Ohzora et al. ........ 188/218 XL |
| 2003/0089563 | A1 | * | 5/2003 | Takakusagi et al. .. 188/218 XL |

FOREIGN PATENT DOCUMENTS

| EP | 0 040 054 A1 | 11/1981 |
| JP | 60-34532 A | 2/1985 |
| JP | 62-128237 U1 | 8/1987 |
| JP | 64-58372 A | 3/1989 |
| JP | 2000-160394 A | 6/2000 |
| WO | WO 00/15879 A1 | 3/2000 |
| WO | WO 00/52227 A1 | 9/2000 |

* cited by examiner

Primary Examiner—Christopher P. Schwartz
(74) Attorney, Agent, or Firm—Foley & Lardner LLP

(57) ABSTRACT

In a cast-iron disc brake rotor (1), each of an outer sliding surface (2a) and an inner sliding surface (3a) is covered with a phosphate coating (8) by electrolysis of a phosphate coating solution containing therein phosphate ions, zinc ions and nitrate ions. This makes it possible to attain dramatically improved rust preventive performance for the sliding surfaces (2a) and (3a). The phosphate coating (8) has a thickness of 1 to 10 µm, a mass of 4 to 35 g/m² and a grain size of less than 50 µm. Preferably, the thickness of the phosphate coating (8) is adjusted to 2 to 8 µm.

11 Claims, 7 Drawing Sheets

ROTATING BRAKE MEMBER OF BRAKING DEVICE FOR VEHICLE AND METHOD FOR ANTIRUST TREATMENT THEREOF

TECHNICAL FIELD

The present invention relates to a rotary braking member that performs as a braking element of a vehicle brake system, and a rust proofing process therefor. More specifically, the present invention relates a brake drum for use in a drum brake or a brake disc rotor for use in a disc brake that has a sliding surface covered with a rust preventive phosphate coating, and a rust proofing process therefor.

BACKGROUND ART

Motor vehicles and other vehicles are generally exported abroad by sea transportation. In the meantime, the vehicles are kept in a storage site near an export port, shipped out, kept in a storage site near an import port, and then, finally delivered to users in an importing country. There may be a case where rust forms on e.g. a brake disc rotor of a disc brake in the vehicle.

The degree of rust formation varies depending on e.g. whether a portion of the brake disc rotor is covered with a brake pad or not. If the brake is operated in such a rusting condition, there arises a variance of braking torque. This phenomenon is so-called "judder", which undesirably causes a vehicle occupant to have an unpleasant feel of braking.

Some rust proofing processes have been tried to prevent the formation of rust that can become a cause of "judder". In one process, a sliding surface of the brake disc rotor is subjected to dacrodized treatment. In another process, rust preventive oil is applied to a sliding surface of the brake disc rotor. Instill another process, a phosphate conversion coating is formed on a sliding surface of the brake disc rotor as disclosed in Japanese Patent Publication No. 1-58372.

It is necessary, in either of these rust proofing processes, not only to protect against rust but also satisfy basic requirements for the braking element as follows.

(a) To attain adequate rust preventive performance for the sliding surface until the vehicle is delivered to a user, without any adverse effect on braking function after the delivery.

(b) To minimize a deterioration in the friction coefficient of sliding surface under initial braking.

(c) To minimize the number of braking operations effected to recover a braking force in what is called "running-in" before the vehicle is delivered to a user.

(d) To prevent wheel nuts from working loose owing to a deterioration in the friction coefficient of road wheel mounting plane.

However, the dacrodized treatment for the sliding surface of the brake disc rotor includes many treatment steps and requires high energy cost for rust proofing, thereby resulting in cost increase. In addition, the dacrodized treatment uses chromium so that much consideration must be given to the environment. Further, the application of rust preventive oil to the sliding surface of the brake disc rotor cannot achieve rust preventive performance over an extended period of time, although its oil application process is easy to perform.

In the formation of phosphate conversion coating e.g. zinc phosphate conversion coating on the sliding surface of the brake disc rotor by phosphate conversion treatment as disclosed in Japanese Patent Publication No. 1-58372, the coating needs to be 4 μm or more in thickness so as to attain necessary and sufficient rust preventive performance, and both of treatment time and treatment temperature are increased for such a thick coating. As a result, the upsizing of equipment and the deterioration of energy efficiency are unavoidable.

Moreover, the built-up of sludge in chemical treatment bath inevitably occurs in the conversion treatment. It is therefore necessary to perform the additional maintenance step of removing the sludge and to dispose of the sludge as industrial waste by professional at a special plant, so that overall cost is unavoidably increased.

DISCLOSURE OF THE INVENTION

In order to solve the above-mentioned problems, the present invention has been made to provide a rotary braking member for use in a vehicle brake system, such as a brake drum or a brake disc rotor, which can insure sufficient rust preventive performance by means of a thin phosphate coating while satisfying the above-mentioned requirements for braking element, and a rust proofing process therefor.

According to the subject matter of Claim 1, there is provided a rotary braking member for use in a vehicle brake system, the braking member being formed into a disc or drum shape and made of an iron material and having at least a portion to be used as a sliding surface against an opposing frictional member, such as a brake pad or a brake shoe, covered with a phosphate coating, the phosphate coating being formed by electrolysis of a phosphate coating solution that contains phosphate ions, zinc ions and nitrate ions and having a thickness of 1 to 10 μm, a mass of 4 to 33 g/m$^2$ and a grain size of 50 μm or less.

According to the subject matter of Claim 2 that methodologically corresponds to the subject matter of Claim 1, there is provided a rust proofing process for a rotary braking member, the braking member being formed into a disc or drum shape and made of an iron material, the process comprising the step of forming a phosphate coating on at least a portion of the braking member to be used as a sliding surface against an opposing frictional member by electrolysis of a phosphate coating solution containing phosphate ions, zinc ions and nitrate ions in such a manner that the phosphate coating has a thickness of 1 to 10 μm, a mass of 4 to 33 g/m$^2$ and a grain size of 50 μm or less.

Herein, the rotary braking member refers to e.g. a cast-iron brake drum of a drum brake, or a cast-iron brake disc rotor of a disc brake.

Further, the phosphate coating solution is prepared by the use of e.g. "PB-EL950M" available from Nihon Parkerizing Co., Ltd. with a phosphate ion content of 20 to 70 g/l, a zinc ion content of 20 to 50 g/l and a nitrate ion content of 30 to 80 g/l.

The electrolysis of the above-mentioned phosphate coating solution leads to the formation of dense phosphate coating i.e. zinc phosphate coating. This makes it possible to improve rust preventive performance dramatically as compared with that of the earlier technology and thereby retard the formation of rust remarkably even under extreme conditions. The dense phosphate coating attains necessary and sufficient rust preventive performance when the coating is at least 1 μm in thickness. The thickness of the phosphate coating may be increased, but the improvement in rust preventive performance becomes saturated when the thickness of the phosphate coating reaches about 10 μm. Thus, the thickness of the phosphate coating is adjusted to a maximum of about 8 μm, preferably about 2 to 8 μm, in view of rust preventive performance in the present invention.

According to the subject matter of Claim 3 that is based on the subject matter of Claim 2, the electrolysis is characteristically performed by setting the rotary braking member to a cathode in the phosphate coating solution and using as an anode an electrode opposed to the portion of the braking member to be used as a sliding surface with a predetermined distance kept between the electrode and the portion of the braking member to be used as a sliding surface.

According to the subject matter of Claim 4, it is clarified that the rotary braking member of Claim 2 or 3 is a brake disc rotor of a disc brake system.

The magnitude of electrolytic effect is dependent on various parameters, such as the shapes of electrodes, the distance between the anode and the cathode, the current density, the treatment time, the concentration of coating solution, the treatment temperature and the like. Thus, each parameter is determined according to the thickness required of the phosphate coating. In the case of limiting the formation of phosphate coating to a specific area, masking is given to the rotary braking member and/or the electrodes as needed. Depending on the shape of the rotary braking member, it is not necessary to complete the phosphate coating of the above predetermined thickness in one operation. The electrolysis may be performed in several operations.

In short, the brake disc rotor or brake drum made of an iron material has at least a portion to be used as a sliding surface against an opposing frictional member coated with a phosphate coating by the electrolysis of phosphate coating solution containing phosphate ions, zinc ions and nitrate ions in such a manner that the phosphate coating has a thickness of 1 to 10 $\mu$m, a mass of 4 to 35 g/m$^2$ and a grain size of 50 $\mu$m or less, according to the subject matters of Claims 1 to 4. It is therefore possible to attain dramatically improved rust preventive performance and corrosion resistance even when the coating thickness is smaller than that of the earlier technology.

According to the subject matters of Claims 2 to 4, the thickness of phosphate coating can be made smaller. This makes it possible to improve energy efficiency by shortening the treatment time and possible to achieve good cost performance and environmental friendliness without the built-up of sludge.

BEST MODE FOR CARRYING OUT THE INVENTION

Figure 1:
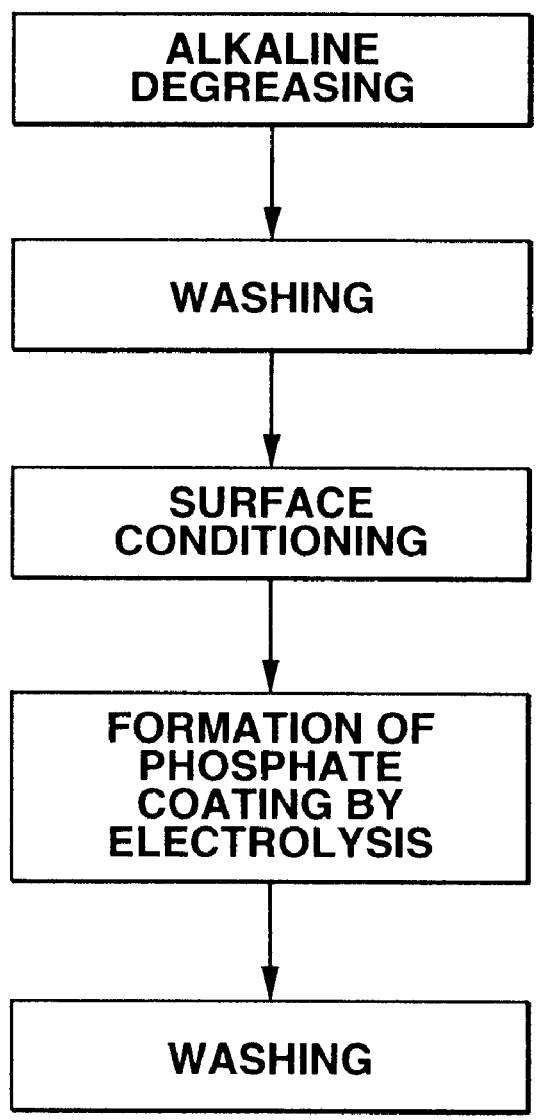
FIG. 1 is a schematic illustration showing a rust proofing process for a brake disc rotor according to a first embodiment of the present invention.
Figure 2:
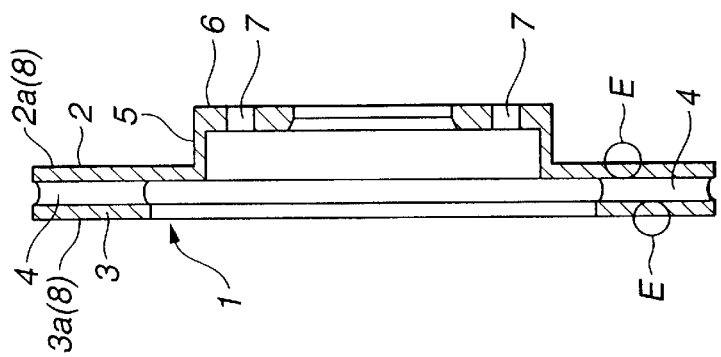
FIG. 2(A) is a front view of the brake disc rotor embodying a rotary braking member of the present invention.
FIG. 2(B) is a sectional view of the brake disc rotor when taken along a line a—a of FIG. 2(A).
Figure 2:
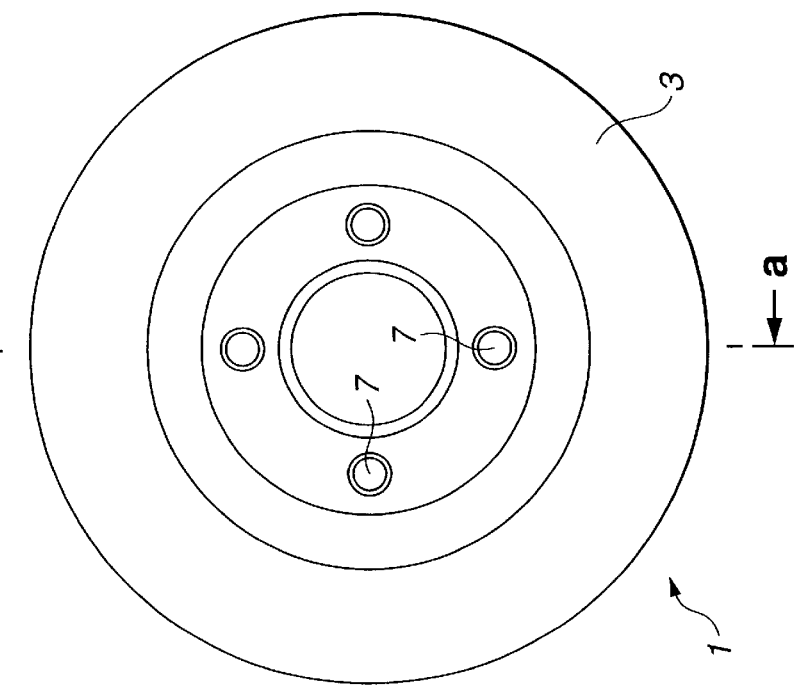
Figure 3:
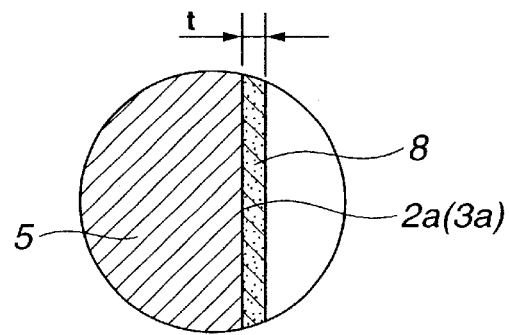
FIG. 3 is an enlarged view of an area E shown in FIG. 2(B).
Figure 4:
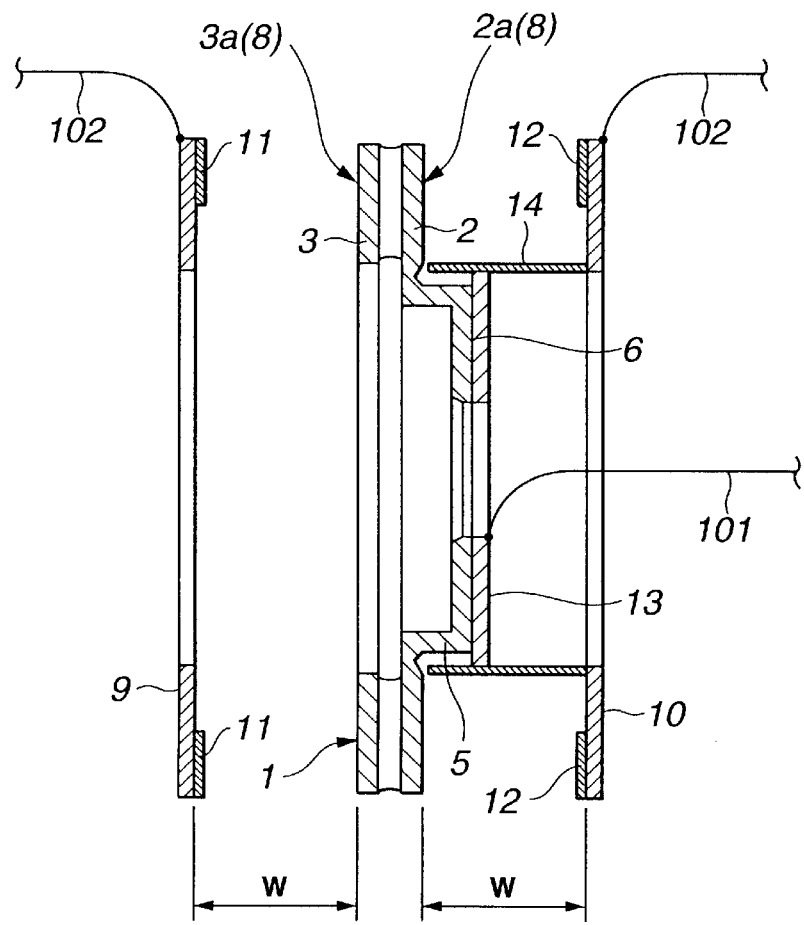
FIG. 4 is a schematic illustration for showing the arrangement of electrodes with respect to the brake disc rotor in the formation of phosphate coating.

FIG. 1 shows a rust proofing process for a ventilated type brake disc rotor according to a first preferred embodiment of the present invention. FIGS. 2 and 3 are detailed illustrations of the brake disc rotor, and FIG. 4 shows in detail a system for electrolysis performed in the process of FIG. 1.

As shown in FIGS. 2 and 3, the ventilated type brake disc rotor 1 is made of e.g. a common cast-iron material (such as FC250), and has an outer sliding plate 2 to be mounted to a outward position in a vehicle, an inner sliding plate 3 to be mounted to an inward position at a predetermined distance from the sliding plate 2 and a plurality of diaphragms 4 disposed in a radial pattern between the sliding plates 2 and 3, so that spaces defined by the sliding plates 2 and 3 and the diaphragms 4 function as ventilation flues. Herein, a reference numeral 5 indicates a cylindrical boss portion formed integrally with the sliding plate 2 so as to have a hat-like sectional profile.

An outermost surface of the boss portion 5 serves as a road wheel mounting plane 6 on which a road wheel is seated. As is well known, hub bolts (not shown) are press fitted in bolt holes 7 of the road wheel mounting plane 6, i.e. the road wheel is fastened to the road wheel mounting plane 6 by means of the hub bolts and wheel nuts (not shown) screwed onto the hub bolts. Further, rust preventive phosphate coatings 8 having a predetermined thickness t are formed on sliding surfaces 2a and 3a of the outer and inner sliding plates 2 and 3. The phosphate coatings 8 are e.g. zinc phosphate coatings.

The phosphate coating 8 has a thickness t of 1 to 10 $\mu$m, preferably 2 to 8 $\mu$m, a mass of 4 to 35 g/m$^2$ and a grain size of 50 $\mu$m or less as described later.

In advance of the electrolysis for the formation of phosphate coatings 8, the brake disc rotor 1 is subjected to alkaline degreasing after machined. The alkaline degreasing is performed at a temperature of 50 to 70° C. for 0.5 minutes or longer by immersing the brake disc rotor 1 in an alkaline cleaner that contains sodium silicate as a main ingredient and has a pH greater than or equal to 12 (such as "FC4360" available from Nihon Parkerizing Co., Ltd., having a concentration of 20 to 40 g/l).

Subsequently, the brake disc rotor 1 is washed with water at an ordinary temperature for 0.5 minutes or longer. After that, the brake disc rotor 1 is surface conditioned by immersing the brake disc rotor 1 in a surface conditioning agent that contains colloidal titanium as a main ingredient (such as "PL-EL200" available from Nihon Parkerizing Co., Ltd., having a concentration of 2 g/l with a titanium content of 50 to 100 PPM). The surface conditioning is performed in order for the phosphate coating 8 to be formed in small thickness with a stable dense crystal structure in the subsequent electrolytic phosphating step.

The electrolysis is performed by immersing the brake disc rotor 1 in a phosphate coating solution containing therein phosphate ions, zinc ions and nitrate ions under the condition that the treatment temperature is 50° C., the current applied is 50 to 72A and the treatment time is 0.5 to 0.8 minutes, so that the phosphate coating (zinc phosphate coating) 8 is formed at least on the sliding surfaces 2a and 3a of the brake disc rotor 1.

As the phosphate coating solution, there can be used e.g. "PB-EL950M" available from Nihon Parkerizing Co., Ltd. The phosphate coating solution is adjusted so as to have a content of free acid (FA) ranging from 15 to 20 PA, a content of total acid (TA) ranging from 55 to 65 Pt and a content of coating promoter ranging from 3 to 8 Pt. The phosphate ions, the zinc ions and the nitrate ions are added in amounts of about 20 to 70 g/l, 20 to 50 g/l and 30 to 80 g/l, respectively, in the phosphate coating solution.

In the electrolysis, electrodes are arranged as shown in FIG. 4. An electrode 13 with an electrode cable 101 is contacted with the brake disc rotor 1 to be treated in the phosphate coating solution, thereby setting the brake disc rotor 1 to a cathode. Further, two annular insoluble electrodes 9 and 10 with electrode cables 102 are used as anodes so as to limit the formation of phosphate coating 8 to the sliding surfaces 2a and 3a. The electrodes 9 and 10 are approximately the same in size to the flat-shaped sliding surfaces 2a and 3a. The electrode 9 is opposed to the sliding surface 3a of the inner sliding plate 3 at a predetermined distance W (e.g. W=about 80 mm) from the sliding surface 3a so as to be parallel with the sliding surface 3a, whereas the electrode 10 is opposed to the sliding surface 2a of the outer sliding plate 2 at the same distance from the sliding surface 2a so as to be parallel with the sliding surface 2a. The electrodes 9 and 10 are partly given masking by insoluble masking materials 11 and 12 so that the formation of phosphate coating 8 is concentrated onto the sliding surfaces 2a and 3a in the electrolysis. In order to prevent the phosphate coating 8 from being formed on the road wheel mounting plane 6, the road wheel mounting plane 6 is given masking by providing a cylindrical masking material 14 so as to bridge the electrode 10 with the electrode 13.

In this condition, current is applied between the cathode and the anodes in order to promote the formation of phosphate coating 8 on the sliding surfaces 2a and 3a. The phosphate coating 8 is formed so as to have a thickness t of 1 to 10 $\mu$m, preferably 2 to 8 $\mu$m, a mass of 4 to 35 g/m$^2$ and a grain size of 50 $\mu$m or smaller. These values are adjusted as appropriate by controlling the concentration of phosphate coating solution, the treatment temperature, the current applied, the treatment time, the voltage, the current density and the like.

When the thickness of the phosphate coating 8 is less than 1 $\mu$m, it is impossible to achieve desired rust preventive performance. When the thickness of the phosphate coating 8 exceeds 10 $\mu$m, the improvement in rust preventive performance becomes so sluggish that there is no point in further increasing the coating thickness.

After the electrolysis, the brake disc rotor 1 is taken out of the phosphate coating solution and then washed with water at an ordinary temperature for 0.5 minutes or longer, as shown in FIG. 1.

The rust preventive performance of the phosphate coatings 8 formed on the sliding surfaces 2a and 3a of the brake disc rotor 1 can be evaluated through a salt spray test. The results on comparison of rust preventive performance are shown in TABLE 1.

TABLE 1

|  | Rust formation rate on sliding surface (%) | | |
| --- | --- | --- | --- |
| Elapsed time after salt spraying | Earlier technology: 4-$\mu$m-thick coating by conversion treatment | Present invention: 2-$\mu$m-thick coating by electrolysis | Present invention: 4-$\mu$m-thick coating by electrolysis |
| 0.5 Hr | 1 | 0 | 0 |
| 1 | 5 | 0 | 0 |
| 2 | 18 | 0 | 0 |
| 3 | 25 | 0 | 0 |
| 4 | 32 | 0 | 0 |
| 5 | 45 | 0 | 0 |
| 6 | 55 | 0 | 0 |
| 7 | 60 | 0 | 0 |
| 8 | 68 | 0 | 0 |
| 9 | 73 | 1 | 1 |
| 10 | 80 | 1 | 1 |

TABLE 1 shows results on comparison of rust preventive performance between a 4-$\mu$m-thick phosphate conversion coating of the earlier technology and 2-$\mu$m-thick and 4-$\mu$m-thick phosphate coatings 8 formed by the electrolysis according to the present invention. In the case of the above phosphate conversion coating, the rate of rust formation increases with the elapsed time after salt spraying, as apparent from TABLE 1. For example, rust forms on 80% of the sliding surfaces 2a and 3a of the brake disc 1 after a lapse of 10 hours from salt spraying. On the other hand, in the case of either of the 2-$\mu$m-thick and 4-$\mu$m-thick phosphate coatings 8 formed by the electrolysis according to the present invention, rust forms on only about 1% of the sliding surfaces 2a and 3a after a lapse of 10 hours from salt spraying. It is thus seen that the phosphate coating 8 of the present invention attains dramatically improved rust preventive performance as compared with the phosphate conversion coating of the earlier technology.

Figure 5:
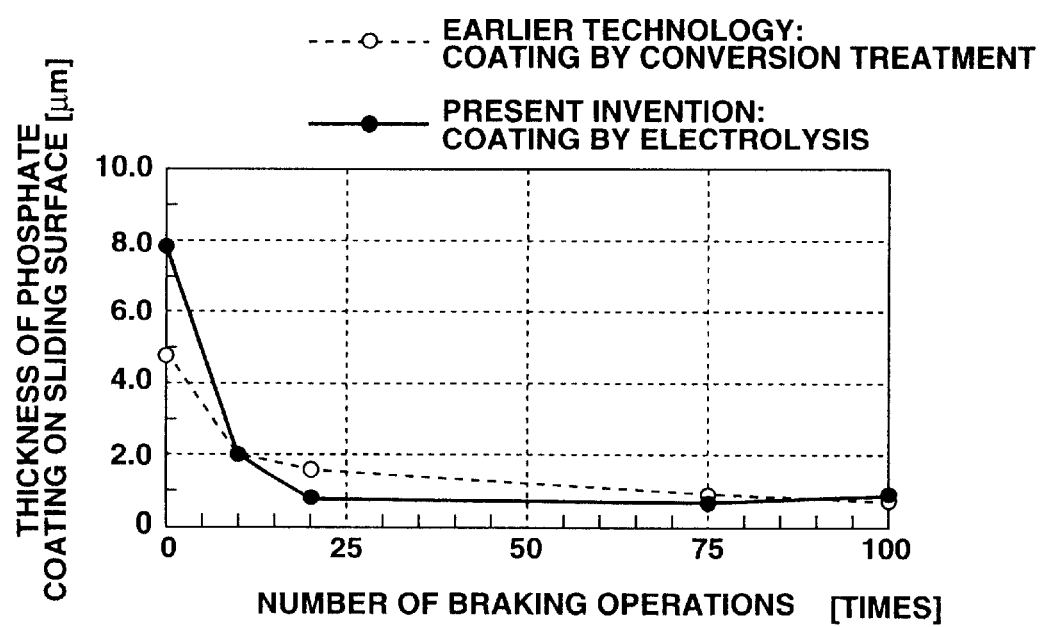
FIG. 5 is a graph showing a relationship between the thickness of rust preventive phosphate coating and the number of braking operations.
Figure 6:
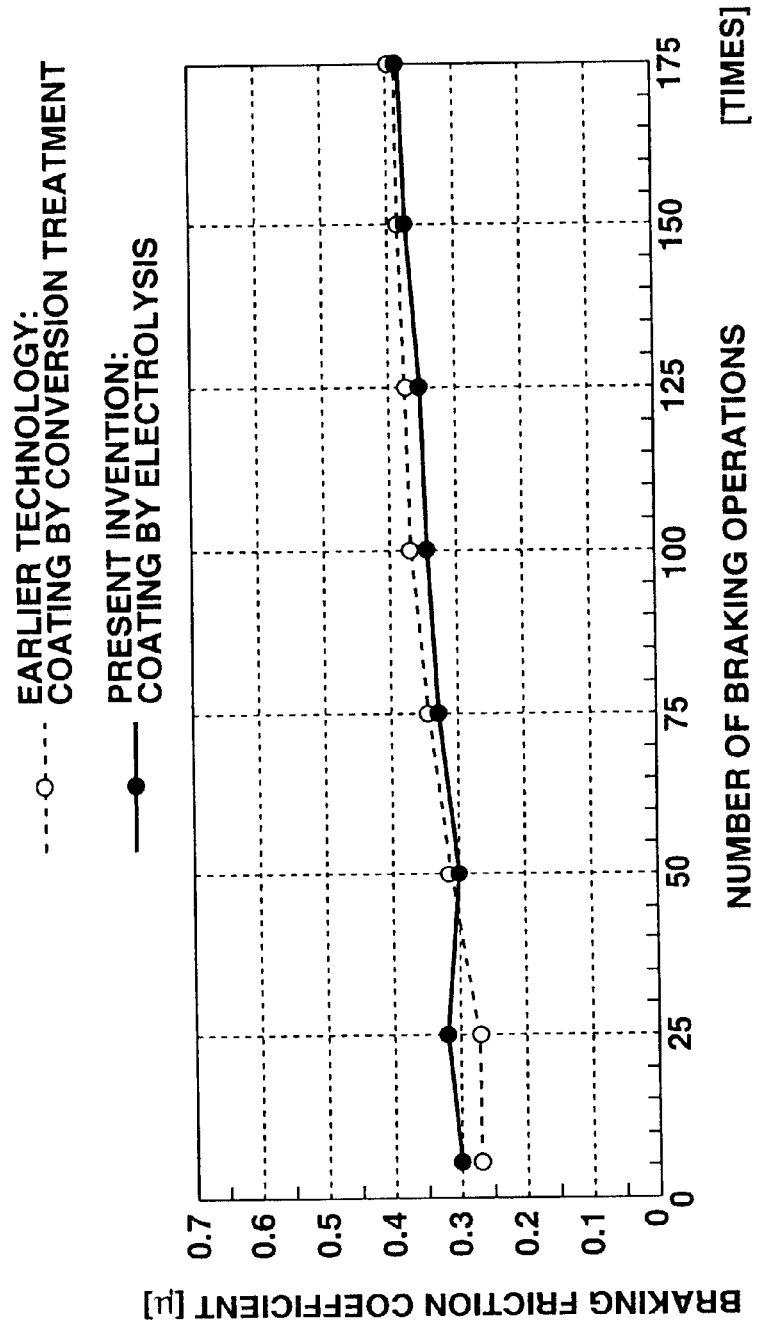
FIG. 6 is a graph for showing a relationship between the friction coefficient of rust preventive phosphate coating and the number of braking operations.

FIG. 5 shows a relationship between the thickness of the phosphate coating 8 and the number of braking operations, and FIG. 6 shows a relationship between the friction coefficient of the phosphate-coated sliding surfaces 2a and 3a and the number of braking operations. As is clear from FIG. 5, the phosphate coatings 8 on the sliding surfaces 2a and 3a of the brake disc rotor 1 are almost removed by a frictional force between the sliding surfaces 2a and 3a and brake pads by the time the brake is operated about 50 times, in the same manner as the phosphate conversion coating of the earlier technology. It is implied that, for example, the phosphate coatings 8 vanish from the sliding surfaces 2a and 3a by the time the vehicle is delivered to a user in oversea exportation. Thus, the basic braking function of the disc brake is not adversely affected, even when the zinc phosphate coating is formed in order to prevent the formation of rust.

Similarly, the friction coefficient of the sliding surfaces 2a and 3a is slightly deteriorated with increase in the number of braking operations performed, as shown in FIG. 6. However, it is possible to attain the minimum friction coefficient i.e. $\mu$=0.2 required of the sliding surfaces 2a and 3a assuredly as long as the phosphate coating 8 remains on the sliding surfaces 2a and 3a of the brake disc rotor 1. When the number of braking operations exceeds 80 times to eliminate almost all of the phosphate coatings 8, the friction coefficient of the sliding surfaces 2a and 3a becomes stabilized at $\mu$=0.3 to 0.4.

Figure 7:
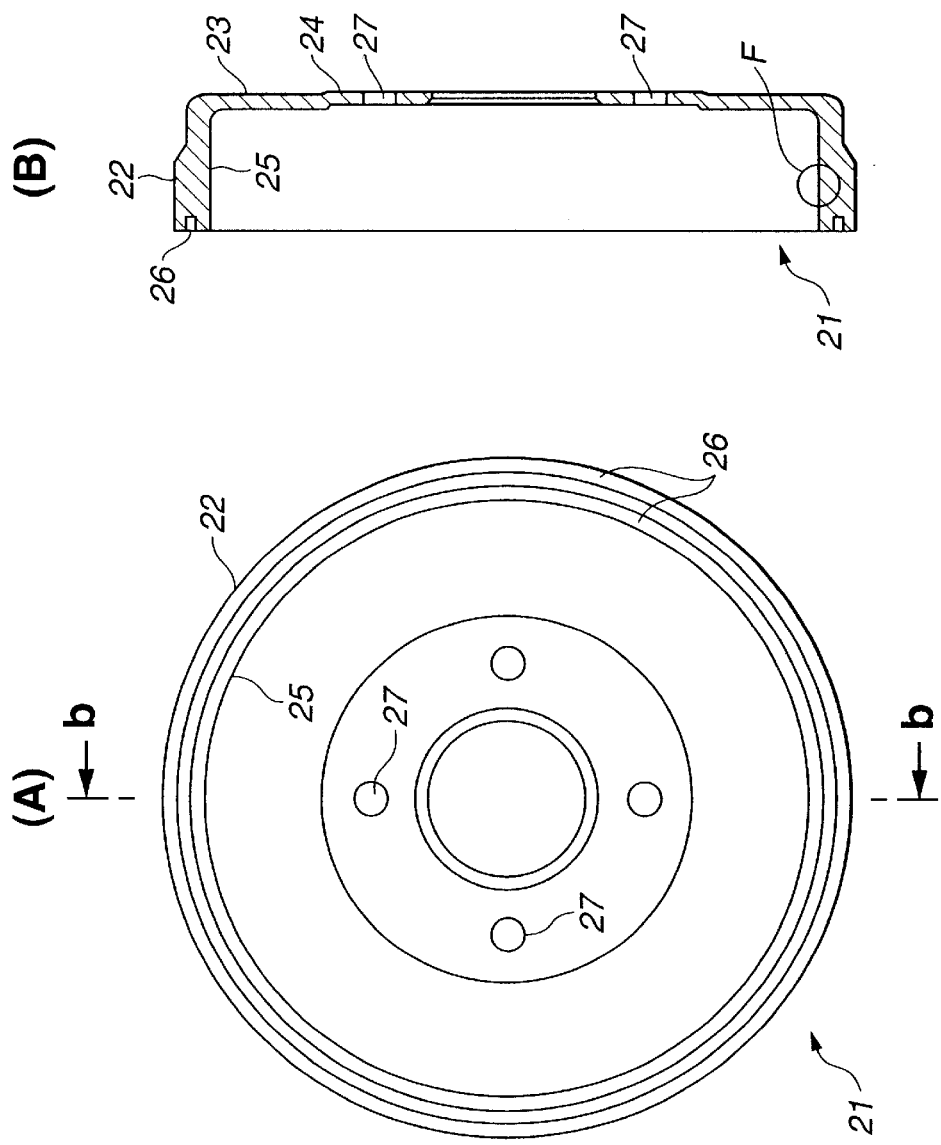
FIG. 7(A) is a front view of a brake drum embodying a rotary braking member according to a second embodiment of the present invention.
FIG. 7(B) is a sectional view of the brake drum when taken along a line b—b of FIG. 7(A).
Figure 8:
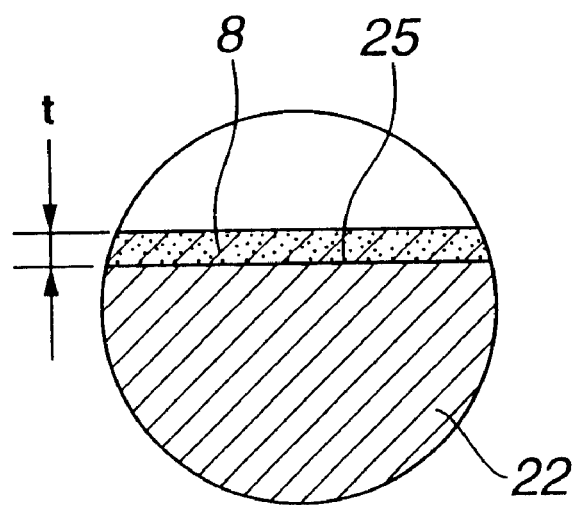
FIG. 8 is an enlarged view of an area F shown in FIG. 7(B).

FIGS. 7 and 8 show a brake drum 21 of a drum brake to which the present invention is applied according to a second preferred embodiment thereof.

As shown in FIG. 7, the brake drum 21 is formed into a bottomed cylindrical shape, and includes a stepped body portion 22 and a bottom portion 23. A section raised at the center of the bottom portion 23 serves as a road wheel mounting plane 24. A sliding surface 25 on the inner surface of the body portion 22, the road wheel mounting plane 24 and an opening edge 26 are machined after formed by metal casting. Then, the body portion 22 except for the sliding surface 25 and the opening edge 26, i.e., the cylindrical outer surface of the body portion 22 and the bottom portion 23 including the road wheel mounting plane 24 are painted. Herein, the road wheel mounting plane 24 is formed with a plurality of bolt holes 27 for engagement with hub bolts.

In advance of the painting, the whole of the brake drum 21 including the sliding surface 25 and the opening edge 26 is covered with a phosphate coating 8, for surface preparation, by electrolysis in the same manner to the first embodiment.

Accordingly, it is possible to attain the same effect in the second embodiment as in the first embodiment.

What is claimed is:

1. A rust proofing process for a rotary braking member, the braking member being formed into a disc or drum shape and made of an iron material, the process comprising the steps of: subjecting the braking member to degreasing; and after said degreasing, forming a phosphate coating on at least a portion of the braking member adapted to be used as a sliding surface against an opposing frictional member, by electrolysis of a phosphate coating solution containing 20 to 70 g/l of phosphate ions, 20 to 50 g/l of zinc ions and 30 to 80 g/l of nitrate ions, in such a manner that the phosphate coating has a thickness of 1 to 10 μm, a mass of 4 to 35 g/m$^2$ and a grain size of 50 μm or less.

2. A rust proofing process according to claim 1, further comprising the step of, before said electrolysis, surface conditioning the braking member.

3. A rust proofing process according to claim 2, wherein the rotary braking member is a brake disc rotor of a disc brake.

4. A rust proofing process according to claim 1, wherein the electrolysis is performed by setting the rotary braking member to a cathode in the phosphate coating solution and using as an anode an electrode opposed to said portion of the braking member at a predetermined distance from said portion.

5. A rust proofing process according to claim 4, wherein said surface conditioning is performed by immersing the braking member in a surface conditioning agent that contains colloidal titanium as a main ingredient.

6. A rust proofing process according to claim 1, wherein the rotary braking member is a brake disc rotor of a disc brake.

7. A rust proofing process according to claim 1, wherein said degreasing is performed by immersing the braking member in an alkaline cleaner that contains sodium silicate as a main ingredient and has a pH greater than or equal to 12.

8. A rust proofing process according to claim 1, wherein the phosphate coating solution has a content of free acid ranging from 15 to 20 PA, a content of local acid ranging from 55 to 65 Pt and a content of coating promoter ranging from 3 to 8 Pt.

9. A rotary braking member for use in a vehicle brake system, the braking member being formed into a disc or drum shape and made of an iron material and comprising at least a portion to be used as a sliding surface against an opposing frictional member covered with a phosphate coating, the phosphate coating being formed by performing electrolysis of a phosphate coating solution that contains phosphate ions, zinc ions and nitrate ions, in such a manner that the phosphate coating has a thickness of 1 to 10 μm, a mass of 4 to 35 g/m$^2$ and a grain size of 50 μm or less.

10. A rust proofing process for a rotary braking member, the braking member being formed into a disc or drum shape and made of an iron material, the process comprising the steps of: forming a phosphate coating on at least a portion of the braking member to be used as a sliding surface against an opposing frictional member, by electrolysis of a phosphate coating solution containing phosphate ions, zinc ions and nitrate ions, in such a manner that the phosphate coating has a thickness of 1 to 10 μm, a mass of 4 to 35 g/m$^2$ and a grain size of 50 μm or less.

11. A rotary braking member for use in a vehicle brake system, the braking member being formed into a disc or drum shape and made of an iron material and comprising at least a portion adapted to be used as a sliding surface against an opposing frictional member covered with a phosphate coating, the phosphate coating being formed by subjecting the braking member to degreasing and, after said degreasing, performing electrolysis of a phosphate coating solution that contains 20 to 70 g/l of phosphate ions, 20 to 50 g/l of zinc ions and 30 to 80 g/l of nitrate ions, in such a manner that the phosphate coating has a thickness of 1 to 10 μm, a mass of 4 to 35 g/m$^2$ and a grain size of 50 μm or less.

* * * * *